United States Patent
Lee et al.

(10) Patent No.: US 7,609,882 B2
(45) Date of Patent: Oct. 27, 2009

(54) IMAGE COMPRESSION AND DECOMPRESSION METHOD CAPABLE OF ENCODING AND DECODING PIXEL DATA BASED ON A COLOR CONVERSION METHOD

(75) Inventors: Kai-Ting Lee, Tainan County (TW); Ling-Shiou Huang, Tainan County (TW)

(73) Assignee: Himax Technologies Limited, Fonghua Village, Sinshih Township, Tainan County (TW)

( * ) Notice: Subject to any disclaimer, the term of this patent is extended or adjusted under 35 U.S.C. 154(b) by 777 days.

(21) Appl. No.: 10/908,773

(22) Filed: May 25, 2005

(65) Prior Publication Data

US 2006/0269126 A1 Nov. 30, 2006

(51) Int. Cl.
*G06K 9/36* (2006.01)
(52) U.S. Cl. .............. 382/166; 382/232; 382/251; 375/240.03; 375/240.21; 375/240.22
(58) Field of Classification Search .......... 382/166
See application file for complete search history.

(56) References Cited

U.S. PATENT DOCUMENTS

| | | | | |
|---|---|---|---|---|
| 3,803,348 A | * | 4/1974 | Limb et al. ............. 348/396.1 |
| 3,860,953 A | * | 1/1975 | Cutler et al. ............. 348/396.1 |
| 4,672,427 A | * | 6/1987 | Rzeszewski ........... 375/240.01 |
| 4,743,959 A | * | 5/1988 | Frederiksen ........... 375/240.25 |
| 5,053,864 A | * | 10/1991 | Thompson ................ 348/717 |
| 5,081,450 A | * | 1/1992 | Lucas et al. ............... 345/615 |
| 5,130,786 A | * | 7/1992 | Murata et al. .......... 375/240.25 |
| 5,247,589 A | * | 9/1993 | Faul et al. ................. 382/166 |
| 5,585,944 A | * | 12/1996 | Rodriguez ................ 358/500 |
| 5,588,069 A | * | 12/1996 | Katayama et al. .......... 382/166 |
| 5,596,655 A | * | 1/1997 | Lopez ..................... 382/173 |
| 5,630,036 A | * | 5/1997 | Sonohara et al. ........... 345/589 |
| 5,768,481 A | * | 6/1998 | Chan et al. ................. 358/1.2 |
| 5,802,210 A | * | 9/1998 | Kurata et al. .............. 382/235 |
| 5,838,455 A | * | 11/1998 | Imaizumi et al. ........... 358/3.1 |
| 5,926,223 A | * | 7/1999 | Hardiman ............. 375/240.03 |
| 5,930,387 A | * | 7/1999 | Chan et al. ................ 382/166 |
| 5,953,691 A | * | 9/1999 | Mills ....................... 702/198 |
| 6,014,468 A | * | 1/2000 | McCarthy et al. ........... 382/254 |

(Continued)

FOREIGN PATENT DOCUMENTS

TW          588253          5/2004

(Continued)

OTHER PUBLICATIONS

Lachlan M. Mackinnon "Video and image Compression Standards", Multimedia Technology, Jan. 2004, F29IG2.

*Primary Examiner*—Matthew C. Bella
*Assistant Examiner*—Sath V. Perungavoor
(74) *Attorney, Agent, or Firm*—Winston Hsu

(57) ABSTRACT

An image compression and decompression method encodes and decodes pixel data based on a color conversion method. Base on the relationships of corresponding color components of two adjacent pixels, the corresponding color components are encoded either by a white and black modification, a down-sampling or an edge modification. Based on the relationships of encoded color components of the two adjacent pixels, the corresponding encoded color components are decoded either by an inverse white and black modification, an up-sampling or an inverse edge modification.

15 Claims, 3 Drawing Sheets

U.S. PATENT DOCUMENTS

| | | | |
|---|---|---|---|
| 6,016,360 A * | 1/2000 | Nguyen et al. | 382/166 |
| 6,292,194 B1 | 9/2001 | Powell, III | |
| 6,393,154 B1 | 5/2002 | Lafe | |
| 6,650,773 B1 * | 11/2003 | Maurer et al. | 382/166 |
| 6,744,919 B2 * | 6/2004 | Said | 382/166 |
| 6,993,199 B2 * | 1/2006 | Chebil | 382/240 |
| 7,239,424 B1 * | 7/2007 | Berkner et al. | 358/2.1 |
| 7,257,251 B2 * | 8/2007 | Matthews | 382/167 |
| 7,310,167 B2 * | 12/2007 | Shirasawa | 358/1.9 |
| 7,529,405 B2 * | 5/2009 | Masuno et al. | 382/166 |
| 2002/0164073 A1 * | 11/2002 | Lei et al. | 382/166 |
| 2003/0021471 A1 * | 1/2003 | Said | 382/166 |
| 2003/0031361 A1 * | 2/2003 | Said | 382/166 |
| 2003/0063810 A1 * | 4/2003 | Chebil | 382/240 |
| 2003/0143864 A1 | 7/2003 | Tanabe et al. | |
| 2004/0101045 A1 * | 5/2004 | Yu et al. | 375/240.02 |
| 2005/0001035 A1 * | 1/2005 | Hawley et al. | 235/462.21 |
| 2005/0168783 A1 * | 8/2005 | Thomas | 358/2.1 |
| 2006/0239563 A1 * | 10/2006 | Chebil et al. | 382/232 |
| 2006/0269126 A1 * | 11/2006 | Lee et al. | 382/166 |
| 2007/0195369 A1 * | 8/2007 | McDowell et al. | 358/1.18 |

FOREIGN PATENT DOCUMENTS

| | | |
|---|---|---|
| TW | 595229 | 6/2004 |

* cited by examiner

IMAGE COMPRESSION AND DECOMPRESSION METHOD CAPABLE OF ENCODING AND DECODING PIXEL DATA BASED ON A COLOR CONVERSION METHOD

BACKGROUND OF INVENTION

1. Field of the Invention

The present invention relates to an image compression and decompression method for encoding and decoding pixel data, and more particularly, to an image compression and decompression method for encoding and decoding pixel data based on a color conversion method.

2. Description of the Prior Art

In many color-processing applications, it is often necessary to convert data between two color spaces. A color space is a region in a 3-dimensional or higher dimensional vector space. Any basis, such as three linearly independent 3-dimensional vectors, defines a color coordinate system. A commonly used color coordinate system is the R (red), G (green), and B (blue), defined by their center wavelengths. Given one 3-dimensional color coordinate system, other 3-dimensional linear color coordinate systems may be represented by a 3.times.3 matrix. For example, the Y, I, Q color coordinate system is defined in terms of R, G, B by the following matrix:

$$\begin{bmatrix} Y \\ I \\ Q \end{bmatrix} = \begin{bmatrix} 0.299 & 0.587 & 0.114 \\ -0.1678 & -0.3313 & 0.5 \\ 0.5 & -0.4187 & -0.0813 \end{bmatrix} \begin{bmatrix} R \\ G \\ B \end{bmatrix}$$

Note that not all color spaces are linear. For example, to better model the human visual system, some color conversions attempt to non-linearly re-scale vectors (e.g., logarithmically). Examples are CIE L*u*v* and L*a*b*.

Different color coordinate systems are defined for various reasons. For example, for data to be displayed on monitors, it is convenient for most digital color images to use the R, G, B coordinate system, in fixed range, such as 6 bits per coordinate. If the application requires color compression for storing or transmitting large amounts of color image data, then the RGB representation is far from optimal. U.S. Pat. No. 5,731,988 issued on Mar. 24, 1998 to Zandi et al. discloses a method for reversible color conversion shown by the following matrix:

$$\begin{bmatrix} Ya \\ Yb \\ Yc \end{bmatrix} = \begin{bmatrix} 0.25 & 0.5 & 0.25 \\ 0 & -1 & 1 \\ 1 & -1 & 0 \end{bmatrix} \begin{bmatrix} R \\ G \\ B \end{bmatrix}$$

The luminance component in this representation is:

$$Ya = \frac{R + 2G + B}{4}$$

The chrominance components are:

$Yb = B - G$ $Yc = R - G$

Data compression is an extremely useful tool for storing and transmitting large amounts of data. For example, the time required to transmit an image is reduced drastically when compression is used to decrease the number of bits required to recreate the image. Many different data compression techniques exist in the prior art. Compression techniques can be divided into two broad categories: lossy coding and lossless coding. In lossless compression, all the information is retained and the data is compressed in a manner that allows for perfect reconstruction. Lossy coding involves coding that results in the loss of information, such that there is no guarantee of perfect reconstruction of the original data. The goal of lossy compression is that changes to the original data are done in such a way that they are not objectionable or detectable.

Therefore in lossy compression, what is desired is a color conversion method capable of encoding input symbols or intensity data prior to conversion into output data and capable of reconstructing original input data from the output data. In the desired color conversion method data compression is achieved by encoding, which is intended to preserve relevant characteristics of the input data while eliminating less important data.

SUMMARY OF INVENTION

It is therefore a primary objective of the claimed invention to provide an image compression and decompression method for encoding and decoding pixel data.

The claimed invention discloses an image compression method for encoding pixel data based on a color conversion method comprising checking if a pixel and an adjacent pixel are either black or white; and if one of the pixels is either black or white, performing a white and black modification on data of the pixels.

The claimed invention also discloses an image compression method for encoding pixel data comprising checking if a difference of corresponding color components of two adjacent pixels is greater than a predetermined value; and if the difference of the color components of the two adjacent pixels is not greater than the predetermined value, down-sampling data of the color components of the pixels.

The claimed invention also discloses an image compression method for encoding pixel data comprising checking if a difference of corresponding color components of two adjacent pixels is greater than a predetermined value; and if the difference of the color components of the two adjacent pixels is greater than the predetermined value, performing an edge modification by removing least significant bits of data of the color components of the pixels.

The claimed invention also discloses an image compression method for encoding pixel data comprising checking if a difference of corresponding color components of a first pixel and a second pixel adjacent to the first pixel is greater than a first predetermined value; checking if a difference of the corresponding color components of a third pixel adjacent to the second pixel, and a fourth pixel adjacent to the third pixel is greater than a second predetermined value; checking if a difference of the corresponding color components of the second pixel and the third pixel is greater than a third predetermined value; and if the difference of the color components of the first and second pixels is greater than the first predetermined value, the difference of the color components of the third and fourth pixels is not greater than the second predetermined value, and the difference of the color components of the second and third pixels is not greater than the third predetermined value, setting the color component of the second pixel to the corresponding color component of the third pixel.

The claimed invention discloses an image decompression method for decoding pixel data comprising checking if two adjacent pixels are black or white; and if the two adjacent pixels contain a pixel which is either black or white, performing an inverse white and black modification on data of the pixels.

The claimed invention also discloses an image decompression method for decoding pixel data comprising checking a pilot bit of two adjacent pixels; and if the pilot bit indicates corresponding color components of the two pixels were encoded by down-sampling, generating corresponding chrominance values of the two pixels by an encoded chrominance value of the two adjacent pixels.

The claimed invention also discloses an image decompression method for decoding pixel data comprising checking a pilot bit of the two adjacent pixels; and if the pilot bit indicates corresponding color components of the two pixels were encoded by edge modification, generating most significant bits of corresponding chrominance values of the two pixels according to an encoded chrominance value of the two adjacent pixels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
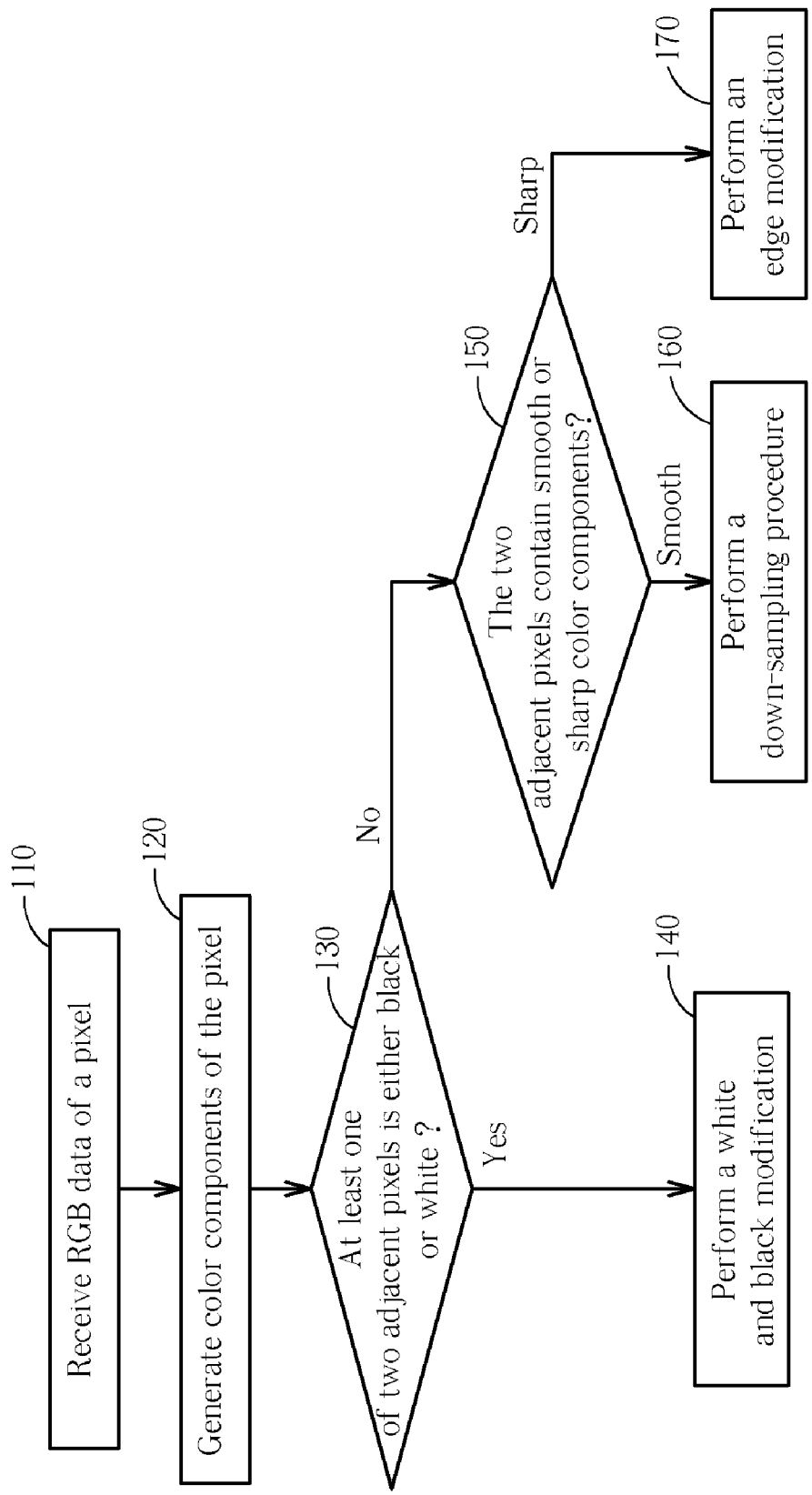
FIG. 1 is a flow chart illustrating a first image compression method according to the present invention.

Please refer to FIG. 1 for a flow chart illustrating a first image compression method according to the present invention. The first image compression method includes the following steps:

Step 110: receive RGB data representing red (R), green (G), and blue (B) components of a pixel;

Step 120: generate color components of the pixel according to the red, green, and blue components of the pixel;

Step 130: check if a pixel is either black or white: if one of two adjacent pixels is either black or white, perform step 140; if the two adjacent pixels are neither black nor white, perform step 150;

Step 140: perform a white and black modification on data of the pixels;

Step 150: check if the two adjacent pixels contain smooth or sharp color components; if the two adjacent pixels contain smooth color components, perform step 160; if the two adjacent pixels contain sharp color components, perform step 170;

Step 160: perform a down-sampling procedure on data of the pixels; and

Step 170: perform an edge modification on data of the pixels.

For ease of explanation, we assume a pixel has an RGB 6/6/6/format, that is, each of the red, green, and blue components is represented by 6 bits. If two adjacent pixels P1 and P2 are stored uncompressed without the present invention method, a 36-bit data width is required for storing the pixels P1 and P2.

In Step 110, the red, green, and blue components of the pixels P1 and P2 are received. Then in step 120, a method disclosed in U.S. Pat. No. 5,731,988 is used for converting the red, green, and blue components of the pixel P1 or P2 into their corresponding color components:

$$Ya = \frac{R+2G+B}{4};$$
$$Yb = B - G;$$
$$Yc = R - G.$$

The luminance component Ya in the above representation remains uncompressed and is retained completely in the method shown in FIG. 1, while the chrominance components Yb and Yc are further processed by steps 130 through 170 and will be discussed in more detail in the following paragraphs. The Ya, Yb and Yc color components obtained from a pixel with an RGB 6/6/6/format have data widths of 6 bits, 7 bits and 7 bits, respectively. The color components representing the pixel P1 are a luminance component Ya1 and two chrominance components Yb1 and Yc1, and the color components representing the pixel P2 are a luminance component Ya2 and two chrominance components Yb2 and Yc2.

In Step 130, it is determined, based on its luminance component Ya obtained in step 120, whether a pixel is black or white. For example, the pixel P1 is black when Ya1 equals to 0, and is white when Ya1 equals to 63; similarly, the pixel P2 is black when Ya2 equals to 0, and is white when Ya2 equals to 63. When a pixel is either black or white, its red, green and blue components are all 0 or 63. Therefore, the chrominance components Yb and Yc are both zero.

In Step 140, the white and black modification is applied to data of the two adjacent pixels P1 and P2 when one of the pixels P1 and P2 is either black or white. If the luminance component Ya1 or Ya2 shows that at least one of the pixels P1 and P2 is either black or white, then the chrominance components of the black or white pixel are set to zero, and the chrominance components of the other pixel are retained. Since the chrominance components of the other pixel are 0 if it is also a black or white pixel, the retained chrominance components will still be zero.

In Step 150, it is determined whether the chrominance components Yb1 and Yc1 of the pixels P1 are smooth or sharp with respect to the chrominance components Yb2 and Yc2 of the pixel P2 when both the pixels P1 and P2 are neither black nor white. The chrominance components Yb1 and Yb2 are smooth if a difference between Yb1 and Yb2 is not greater than a first predetermined value, and are sharp if a difference between Yb1 and Yb2 is greater than the first predetermined value. Similarly, the chrominance components Yc1 and Yc2 are smooth if a difference between Yc1 and Yc2 is not greater than a second predetermined value, and are sharp if a difference between Yc1 and Yc2 is greater than the second predetermined value. The first and the second predetermined can be set to the same or different values.

In Step 160, the down-sampling procedure is applied to data of the pixels P1 and P2 when the pixels P1 and P2 contain smooth color components. If Yb1 of the pixel P1 and Yb2 of the pixel P2 are smooth, Yb1 and Yb2 are down-sampled by storing an average value of Yb1 and Yb2 and a pilot bit is generated to indicate that Yb1 and Yb2 are encoded by the down-sampling procedure. If Yc1 of the pixel P1 and Yc2 of the pixel P2 are smooth, Yc1 and Yc2 are down-sampled by storing an average value of Yc1 and Yc2 and a pilot bit is generated to indicate that Yc1 and Yc2 are encoded by the down-sampling procedure. In other words, after the down-sampling procedure, the average of Yb1 and Yb2 represents both Yb1 of the pixel P1 and Yb2 of the pixel P2, and the average of Yc1 and Yc2 represents both Yc1 of the pixel P1 and Yc2 of the pixel P2. For the pixels P1 and P2 with the RGB 6/6/6/format, a data width of 14 bits is required for storing both the chrominance components of the pixels P1 and P2 without data compression. However, with the present invention method, a data width of only 8 bits (7 bits for the average of the chrominance components and 1 bit for the pilot bit) is required for storing both the chrominance components of the pixels P1 and P2 after the down-sampling procedure of the present invention, whereby 6 bits can be reserved for other purposes.

In Step 170, the edge modification is applied to data of the pixels P1 and P2 when the pixels P1 and P2 contain sharp color components. If Yb1 of the pixel P1 and Yb2 of the pixel P2 are sharp, least significant bits (LSBs) of Yb1 and Yb2 are removed and a pilot bit is set to indicate that Yb1 and Yb2 are encoded with the edge modification. For example, if data width of 7 bits is used for storing Yb1 and Yb2, then 4 most significant bits (MSBs) of Yb1 and 3 MSBs of Yb1 are retained, while data contained in 3 LSBs of Yb1 and 4 LSBs of Yb2 are removed. Since the most relevant characteristics of an input data are represented by MSBs of the input data, even if the original input data cannot be reconstructed completely from its MSBs after the edge modification, only less important data represented by their LSBs is eliminated. The number of MSBs of each chrominance components to be retained and how they are stored as encoded data can vary in the present invention method. Retaining more MSBs means the reconstructed data is closer to the original data, while retaining fewer MSBs means better data compression ratio. The retained MSBs of Yb1 can be stored as MSBs of the encoded data and the retained MSBs of Yb2 can be stored as LSBs of the encoded data, and vice versa.

In the down-sampling procedure in step 160 and the edge modification in step 170, a pilot bit PB is generated for both types of the chrominance components Yb1, Yb2, Yc1 and Yc2 of the pixels P1 and P2. A pilot bit PB indicating that the pixels P1 and P2 have sharp chrominance components does not necessarily reveal that all the components Yb1, Yb2, Yc1 and Yc2 are sharp. It is possible that only Yb1 and Yb2 or only Yc1 and Yc2 are sharp. However, both types of the chrominance components Yb1, Yb2, Yc1 and Yc2 of the pixels P1 and P2 can have respective pilot bits PB1 and PB2 generated in the down-sampling procedure in step 160 and the edge modification in step 170. The pilot bit PB1 indicates whether the chrominance component Yb1 of the pixel P1 and the chrominance component Yb2 of the pixel P2 are sharp or smooth, and the pilot bit PB2 indicates that whether the chrominance component Yc1 of the pixel P1 and the chrominance component Yc2 of the pixel P2 are sharp or smooth. In other words, for color components to be encoded with the present invention method, each of the color components can share the same pilot bit, or has its own corresponding pilot bit.

In Step 150, it is determined whether the pixels P1 and P2 contain smooth or sharp color components based on the first and second predetermined values. The first and second predetermined values can be set according to the edge modification in step 170. For example, if Yb1 and Yb2 are both 7-bit data, data width of 7 bits is used for storing Yb1 and Yb2, and 4 MSBs of Yb1 and 3 MSBs of Yb1 are retained, then a data discrepancy ranging from −7 to 7 ($\pm 2^3 - 1$) results from removing data contained in the 3 LSBs of Yb1 and a data discrepancy ranging from −15 to 15 ($\pm 2^4 - 1$) results from removing data contained in the 4 LSBs of Yb2. Therefore, the first predetermined value can be set to 7 and the second predetermined values can be set to 15, or both the first and the second predetermined values can be set to 15. The first and second predetermined values can also be set in a different way in other applications.

Figure 2:
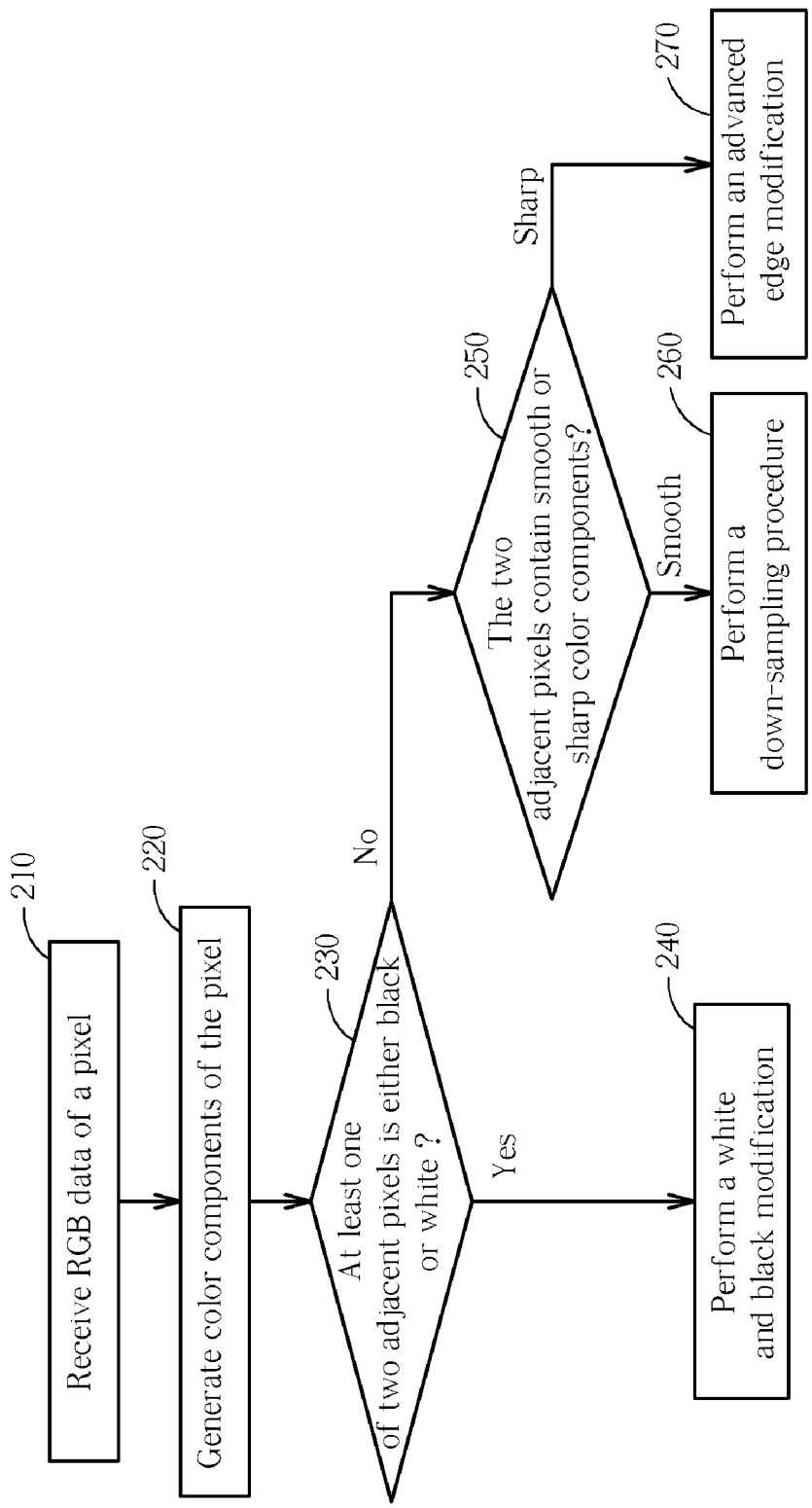
FIG. 2 is a flow chart illustrating a second image compression method according to the present invention.

Please refer to FIG. 2 for a flow chart illustrating a second image compression method according to the present invention. The second image compression method includes following steps:

Step 210: receive RGB data representing red, green, and blue components of a pixel;

Step 220: generate color components of the pixel according to the red, green, and blue components of the pixel;

Step 230: check if a pixel is either black or white: if one of two adjacent pixels is either black or white, perform step 240; if the two adjacent pixels are neither black nor white, perform step 250;

Step 240: perform a white and black modification on data of the pixels;

Step 250: check if the two adjacent pixels contain a smooth or sharp color component; if the two adjacent pixels contain a smooth color component, perform step 260; if the two adjacent pixels contain a sharp color component, perform step 270;

Step 260: perform a down-sampling procedure on data of the pixels; and

Step 270: perform an advanced edge modification on data of the pixels.

FIG. 2 differs from FIG. 1 in that in step 270 the advanced edge modification is performed instead of the edge modification of step 170. The advanced edge modification in step 270 is applied to four consecutive pixels P1, P2, P3, P4. If Yb1 of the pixel P1 and Yb2 of the pixel P2 are sharp, a chrominance component Yb3 of the pixel P3 and a chrominance component Yb4 of the pixel P4 are smooth, and Yb2 of the pixel P2 and Yb3 of the pixel P3 are smooth, then Yb2 is updated to Yb3 followed by removing LSBs of Yb1 and the updated Yb2, and by setting a pilot bit indicating that the pixels P1 and P2 are processed with the advanced edge modification. Predetermined values used to identify whether the color components of the pixels P1 and P2, the pixels P3 and P4, and the pixels P2 and P3 are sharp or smooth respectively can have the same or different values.

Figure 3:
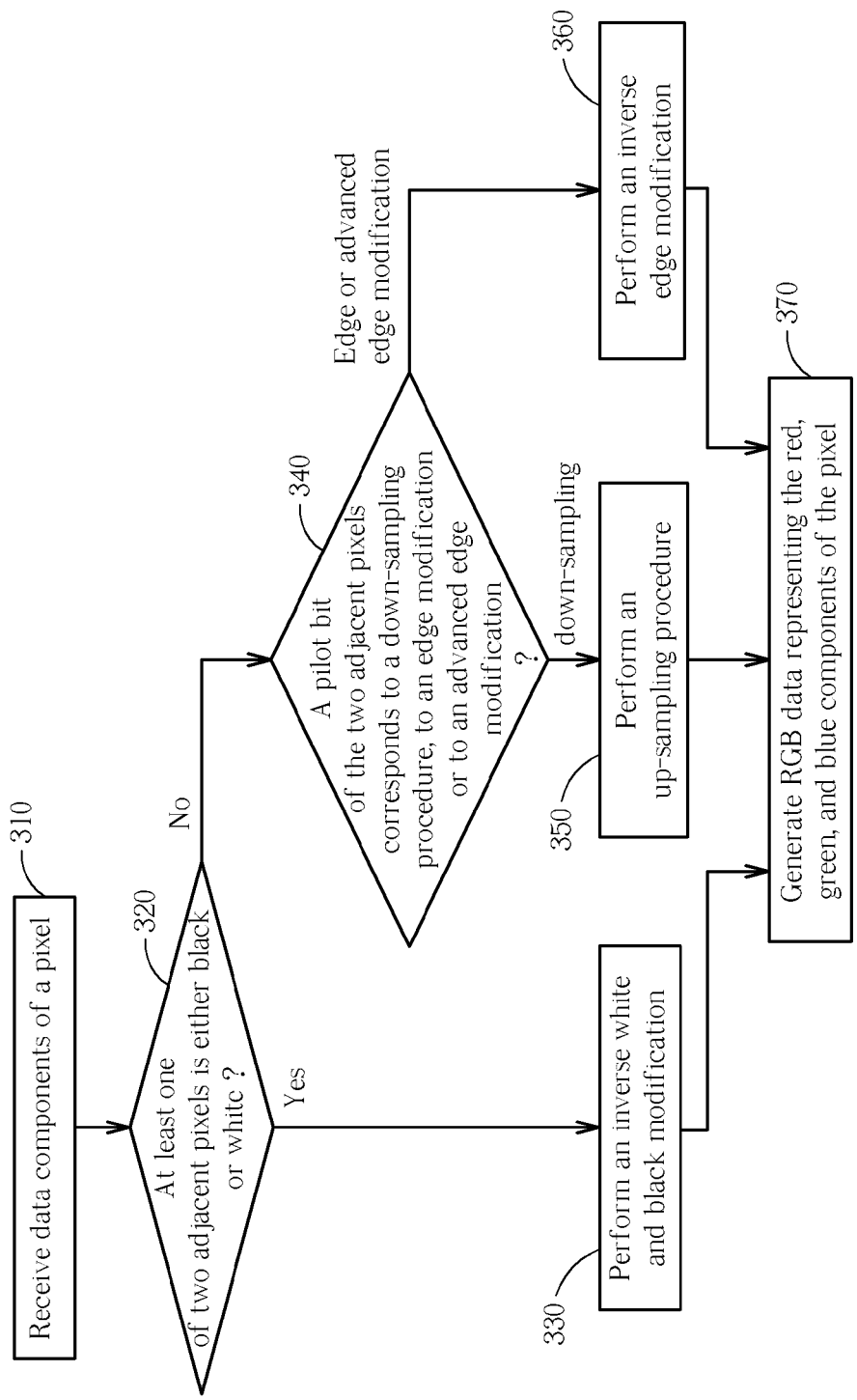
FIG. 3 is a flow chart illustrating an image decompression method according to the present invention.

If the two adjacent pixels P1 and P2 are encoded with the present invention methods shown in FIG. 1 or FIG. 2, luminance components Ya1 and Ya2, an encoded chrominance input DYb representing Yb1 and Yb2 of the pixels P1 and P2, and an encoded chrominance input DYc representing Yc1 and Yc2 of the pixels P1 and P2 are generated. Data components Ya1, Ya2, DYb and DYc have to be decoded before being sent to another system. Please refer to FIG. 3 for a flow chart illustrating an image decompression method according to the present invention. The image decompression method includes following steps:

Step 310: receive data components of a pixel;

Step 320: check if two adjacent pixels are either black or white; if one of two adjacent pixels is either black or white, perform step 330; if the two adjacent pixels are neither black nor white, perform step 340;

Step 330: perform an inverse white and black modification on data of the pixels; perform step 370;

Step 340: check a pilot bit of the two adjacent pixels; if the pilot bit indicates corresponding color components of the two pixels were encoded by a down-sampling procedure, perform step 350; if the pilot bit indicates the corresponding color components of the two pixels were encoded by an edge modification or an advanced edge modification, perform step 360;

Step 350: perform an up-sampling procedure on data of the pixels; perform step 370;

Step 360: perform an inverse edge modification on data of the pixels; and

Step 370: generate RGB data representing the red, green, and blue components of the pixel.

After the data components Ya1, Ya2, DYb and DYc are received in step 310, in step 320 it is determined whether the pixels P1 and P2 are either white or black. Since the luminance components Ya1 and Ya2 of the pixels P1 and P2 are retained completely in the methods shown in FIG. 1 and FIG. 2, the pixel P1 is black when Ya1 equals to 0, and is white when Ya1 equals to 63; similarly, the pixel P2 is black when Ya2 equals to 0, and is white when Ya2 equals to 63.

In Step 330, the inverse white and black modification is applied to data components of the pixels P1 and P2 when one of the pixels P1 and P2 is either black or white. If Ya1 indicates that the pixel P1 is either black or white, reconstructed chrominance components Yb1' and Yc1' of the pixel P1 are generated by setting both Yb1' and Yc1' to zeros, and reconstructed chrominance components Yb2' and Yc2' of the pixel P2 are generated according to DYb and DYc respectively. Similarly, if Ya2 indicates that the pixel P2 is either black or white, the reconstructed chrominance components Yb2' and Yc2' of the pixel P2 are generated by setting both Yb2' and Yc2' to zeros, and the reconstructed chrominance components Yb1' and Yc1' of the pixel P1 are generated according to DYb and DYc respectively.

In Step 340, the pilot bit of the pixels P1 and P2 is checked. If the chrominance components Yb1, Yb2, Yc1 and Yc2 share a same pilot bit PB, the reconstructed chrominance component Yb1', Yb2', Yc1' and Yc2' are generated according to the pilot bit PB. If the chrominance components Yb1, Yb2 and the chrominance components Yc1, Yc2 have respective pilot bits PB1 and PB2, the reconstructed chrominance components Yb1' and Yb2' are generated according to the pilot bit PB1, and the reconstructed chrominance components Yc1' and Yc2' are generated according to the pilot bit PB2.

In Step 350, the up-sampling procedure is applied to the data components of the pixels P1 and P2 when the pilot bit indicates corresponding color components of the two pixels were encoded by the down-sampling procedure. The up-sampling procedure generates the reconstructed chrominance components Yb1' and Yb2' of the pixels P1 and P2 by setting both Yb1' and Yb2' to the value of DYb, and generates the reconstructed chrominance components Yc1' and Yc2' of the pixels P1 and P2 by setting both Yc1' and Yc2' to the value of DYc. Consequently, Yb1' and Yb2' will have the same value after the up-sampling procedure. Also, Yc1' and Yc2' will have the same value after the up-sampling procedure.

In Step 360, the inverse edge modification is applied to the data components of the pixels P1 and P2 when the pilot bit indicates corresponding color components of the two pixels were encoded by the edge modification or the advanced edge modification. If the retained MSBs of Yb1 are stored as MSBs of the encoded chrominance input DYb and the retained MSBs of Yb2 are stored as LSBs of the encoded chrominance input DYb, MSBs of the reconstructed chrominance component Yb1' of the pixel P1 are generated according to MSBs of DYb, and MSBs of the reconstructed chrominance component Yb2' of the pixel P2 are generated according to LSBs of DYb. Similarly, if the retained MSBs of Yc1 are stored as MSBs of the encoded chrominance input DYc and the retained MSBs of Yc2 are stored as LSBs of the encoded chrominance input DYc, MSBs of the reconstructed chrominance component Yc1' of the pixel P1 are generated according to MSBs of DYc, and MSBs of the reconstructed chrominance component Yc2' of the pixel P2 are generated according to LSBs of DYc. For example, if the 4 MSBs of Yb1 are retained in the MSBs of the DYb and the 3 MSBs of Yb2 are retained in the LSBs of the DYb, reconstructed chrominance component Yb1' of the pixel P1 is generated by setting its MSBs according to the 4 MSBs of DYb and setting its LSBs to zeros or other values, and reconstructed chrominance component Yb2' of the pixel P2 is generated by setting its MSBs according to the 3 LSBs of DYb and setting its LSBs to zeros or other values.

In Step 370, reconstructed RGB data of a pixel is generated from its luminance component and reconstructed chrominance components obtained in steps 320, 340 or 350 with the following formulae:

$$G' = Ya - \left\lfloor \frac{Yb' + Yc'}{4} \right\rfloor;$$

$$R' = Yc' + G';$$

$$B' = Yb' + G'.$$

With the image compression and decompression method of the present invention, RGB data of a pixel can be compressed and transmitted as encoded data in an efficient way. After transmission, the encoded data can be decoded and data containing most relevant characteristics of the original data can be generated. The embodiments described above illustrate but do not limit the present invention. The present invention is not limited to the particular numbers of bits described above, or to the color conversion methods in steps 120, 220 and 370. The present invention can be implemented by software programmable computer processors and is particularly suitable for image compression for mobile phone thin film transistor (TFT) driver integrated circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer implemented method for encoding pixel data comprising:
    checking if a pixel and an adjacent pixel are either black or white;
    if one of the pixels is either black or white, performing a white and black modification on data of the pixels by equalizing red, green and blue components of the pixel which is either black or white;
    checking if a difference of a color component of the pixel and a same color component of the adjacent pixel is greater than a predetermined value;
    if the difference of the color components of the two adjacent pixels is not greater than the predetermined value, generating an average of the color components of the pixels and generating a pilot bit; and
    if the difference of the color components of the two adjacent pixels is greater than the predetermined value, removing least significant bits (LSBs) of data of the color components of the pixels and generating a pilot bit.

2. The computer implemented method of claim 1 further comprising converting data of the pixels to generate color components of the pixels.

3. The computer implemented method of claim 1 wherein performing a white and black modification on data of the pixels further comprises removing data of a color component of the pixel which is either black or white and retaining data of a corresponding color component of the adjacent pixel.

4. A computer implemented method for encoding pixel data comprising:
    checking if a difference of corresponding color components of two adjacent pixels is greater than a predetermined value;
    if the difference of the color components of the two adjacent pixels is not greater than the predetermined value, down-sampling data of the color components of the pixels and generating a pilot bit corresponding to down-sampling;
    checking if the pixels are black or white one-by-one, and if the pixels contain a black or white pixel, performing a white and black modification on data of the pixels by equalizing red, green and blue components of the pixel which is either black or white.

5. The computer implemented method of claim 4 wherein performing a white and black modification on data of the pixels further comprises removing data of the color component of the pixel which is either black or white and retaining data of the corresponding color component of the adjacent pixel.

6. The computer implemented method of claim 4 further comprising converting data of the pixels to generate the color components of the pixels.

7. The computer implemented method of claim 4 wherein down-sampling data of the color components of the pixels is generating an average of the color components of the pixels.

8. A computer implemented method for encoding pixel data comprising:
    checking if a difference of corresponding color components of a first pixel and a second pixel adjacent to the first pixel is greater than a predetermined value;
    if the difference of the color components of the first and second pixels is greater than the predetermined value, performing an edge modification by removing least significant bits (LSBs) of data of the color components of the pixels and generating a pilot bit corresponding to removing the LSBs; and
    checking if the pixels are black or white one-by-one, and if the pixels contain a black or white pixel, performing a white and black modification on data of the pixels by equalizing red, green and blue components of the pixel which is either black or white.

9. The computer implemented method of claim 8 wherein performing a white and black modification on data of the pixels further comprises removing data of the color component of the pixel which is either black or white and retaining data of the corresponding color component of the adjacent pixel.

10. The computer implemented method of claim 8 further comprising converting data of the pixels to generate the color components of the pixels.

11. The computer implemented method of claim 8 further comprising:
    checking if a difference of the corresponding color components of a third pixel adjacent to the second pixel, and a fourth pixel adjacent to the third pixel is greater than a second predetermined value;
    checking if a difference of the corresponding color components of the second pixel and the third pixel is greater than a third predetermined value; and
    if the difference of the color components of the first and second pixels is greater than the first predetermined value, the difference of the color components of the third and fourth pixels is not greater than the second predetermined value, and the difference of the color components of the second and third pixels is not greater than the third predetermined value, setting the color component of the second pixel to the corresponding color component of the third pixel.

12. The computer implemented method of claim 11 further comprising down-sampling data of the color components of the third and fourth pixels.

13. The computer implemented method of claim 12 wherein down sampling data of the color components of the third and fourth pixels is generating an average of the color components of the third and fourth pixels.

14. The computer implemented method of 12 further comprising generating a pilot bit corresponding to down-sampling.

15. The computer implemented method of claim 11 wherein the first, second and third predetermined values are the same.

* * * * *